US 6,561,075 B2

(12) United States Patent
Haerr et al.

(10) Patent No.: US 6,561,075 B2
(45) Date of Patent: May 13, 2003

(54) POWER BOOSTER WITH MECHANICAL PANIC ASSIST FUNCTION

(75) Inventors: Timothy A. Haerr, Enon, OH (US); Gary C. Fulks, Spring Valley, OH (US); Michael C. Pfeil, South Charleston, OH (US)

(73) Assignee: Delphi Technologies, Inc., Troy, MI (US)

( * ) Notice: Subject to any disclaimer, the term of this patent is extended or adjusted under 35 U.S.C. 154(b) by 64 days.

(21) Appl. No.: 09/852,237

(22) Filed: May 9, 2001

(65) Prior Publication Data

US 2002/0166443 A1 Nov. 14, 2002

(51) Int. Cl.$^7$ .............................. F15B 9/10; B60T 13/20
(52) U.S. Cl. ........................ 91/369.2; 91/376 R; 60/554
(58) Field of Search ............................ 91/369.2, 369.3, 91/376 R; 60/554

(56) References Cited

U.S. PATENT DOCUMENTS

| | | | |
|---|---|---|---|
| 5,873,296 A | 2/1999 | Shirahata et al. | 91/369.2 |
| 5,927,832 A | 7/1999 | Fulks et al. | 303/167 |
| 6,006,649 A | 12/1999 | Parker et al. | 91/369.2 |
| 6,135,007 A * | 10/2000 | Tsubouchi | 91/369.2 |
| 6,397,723 B1 * | 6/2002 | Suwa | 91/369.2 |
| 6,408,738 B1 * | 6/2002 | Harth et al. | 91/369.2 |

* cited by examiner

Primary Examiner—Edward K. Look
Assistant Examiner—Michael Leslie
(74) Attorney, Agent, or Firm—Scott A. McBain

(57) ABSTRACT

A power booster for a brake system including a housing having an interior and a diaphragm separating the interior of the housing into at least two chambers. A power piston is coupled for movement with the diaphragm and includes an output member. A reaction member is coupled to the power piston, and an input member is adapted to be coupled to a movable brake pedal. An air valve assembly moves between open and closed positions to selectively admit atmospheric air into at least one of the chambers. This induces an output force on the diaphragm that is transferred to the output member of the power piston. The air valve assembly includes a portion adapted to engage the reaction member in response to an input force applied to the input member and is length adjustable between the input member and the reaction member. The air valve assembly operates at a first length when an input force is applied to the input member at a first rate and the air valve assembly operates at a second length shorter than the first length when an input force is applied to the input member at a second, higher rate. This lowers the input force needed to maintain a constant output force.

19 Claims, 4 Drawing Sheets

POWER BOOSTER WITH MECHANICAL PANIC ASSIST FUNCTION

FIELD OF THE INVENTION

The present invention generally relates to power boosters for brake systems, such as those used in automobiles, for intensifying the input force between a brake pedal and a master cylinder.

BACKGROUND OF THE INVENTION

Brake power boosters generally utilize fluid pressure, or differentials thereof, to provide a power assist in applying force to the master cylinder of the brake system. Upon application of an input force on the brake pedal, an input member such as a pushrod activates the power booster. The power booster intensifies the force by a calibrated amount and transfers the force to a power piston which then moves the master cylinder to apply the brakes at each wheel. Power boosters also include a mechanism for transferring the feel of the brake operation back from the master cylinder through the power booster to the brake pedal. This allows the vehicle operator to feel whether they are applying more or less force with their foot. A typical mechanism includes a reaction body and a reaction disc each carried within the power piston. When the brakes are applied, a reaction force is transmitted back through the power piston and reaction disc. The reaction disc is resilient so that it may be compressed and partially extruded through the annular reaction body thereby transferring a portion of the total output force back to the brake pedal.

In conventional power boosters, an air valve assembly is opened upon depression of the brake pedal by the operator to admit atmospheric air to at least a first chamber of the power booster housing. This creates a pressure differential across a diaphragm separating the first chamber from a second chamber of the housing. The diaphragm is coupled to the power piston and transmits a force resulting from the pressure differential to the power piston and, ultimately, to the master cylinder. During normal brake application rates, the air valve assembly operates as described and the resilient reaction disc provides a reaction or feedback force to the operator through the air valve assembly to the brake pedal. However, during high rate or so-called panic apply rates, the lag of the power booster forces the air valve assembly into a run out condition. In this condition, the operator is essentially applying force directly to the power piston and the master cylinder until such time as the pressure differential of the power booster takes over with a higher applied force. Thus, during this run out period, the operator must apply an extremely high level of force to the brake pedal to move the power piston itself instead of simply moving the air valve assembly to an open position.

For these general reasons, it would be desirable to provide a power booster that maintains a high output force to the master cylinder with a reduced input force from the vehicle operator especially in high rate or panic applications of force to the brake pedal.

SUMMARY OF THE INVENTION

The present invention generally provides a power booster for a brake system with an air valve assembly having the ability to shorten in length during a high rate application of the brakes. This allows the power booster to maintain a high output force with a reduced input force on the brake pedal. The invention also improves pressure response of the brake system over conventional brake systems as the operator can apply higher forces with a lower input force on the brake pedal. This can lead to shorter vehicle stopping distances.

Generally, the power booster of this invention includes a housing having an interior and a movable diaphragm separating the interior of the housing into at least two chambers. A power piston is coupled for movement with the diaphragm and includes an output member. A resilient reaction disc is coupled to the power piston and an annular reaction body is also coupled to the power piston and positioned adjacent to the resilient reaction disc. An input member is adapted to be coupled to a movable brake pedal and is coupled to an air valve assembly. The input member moves the air valve assembly between open and closed positions to selectively admit atmospheric air into at least one of the chambers to induce an output force on the diaphragm which is transferred to the output member of the power piston.

In accordance with the invention, the air valve assembly is length adjustable between the input member and the resilient reaction disc. Preferably, one end of the air valve assembly selectively engages the resilient reaction disc through the annular reaction body. The air valve assembly operates at a first length when an input force is applied to the input member at a first rate to move the air valve assembly to the open position. The air valve operates at a second, shorter length when the input force is applied by the operator at a second, higher rate thereby lowering the input force needed to maintain a desired output force.

In another aspect of the invention, a button member is positioned within the annular reaction body and stops against a portion of the reaction body when the air valve is operating at the second, shorter length. This prevents transmission of a reaction force to the operator from the reaction disc.

Various objectives, advantages and features of the invention will become more readily apparent to those of ordinary skill in the art upon review of the following detailed description of the preferred embodiment taken in conjunction with the accompanying drawings.

DETAILED DESCRIPTION OF THE PREFERRED EMBODIMENT

Figure 1:
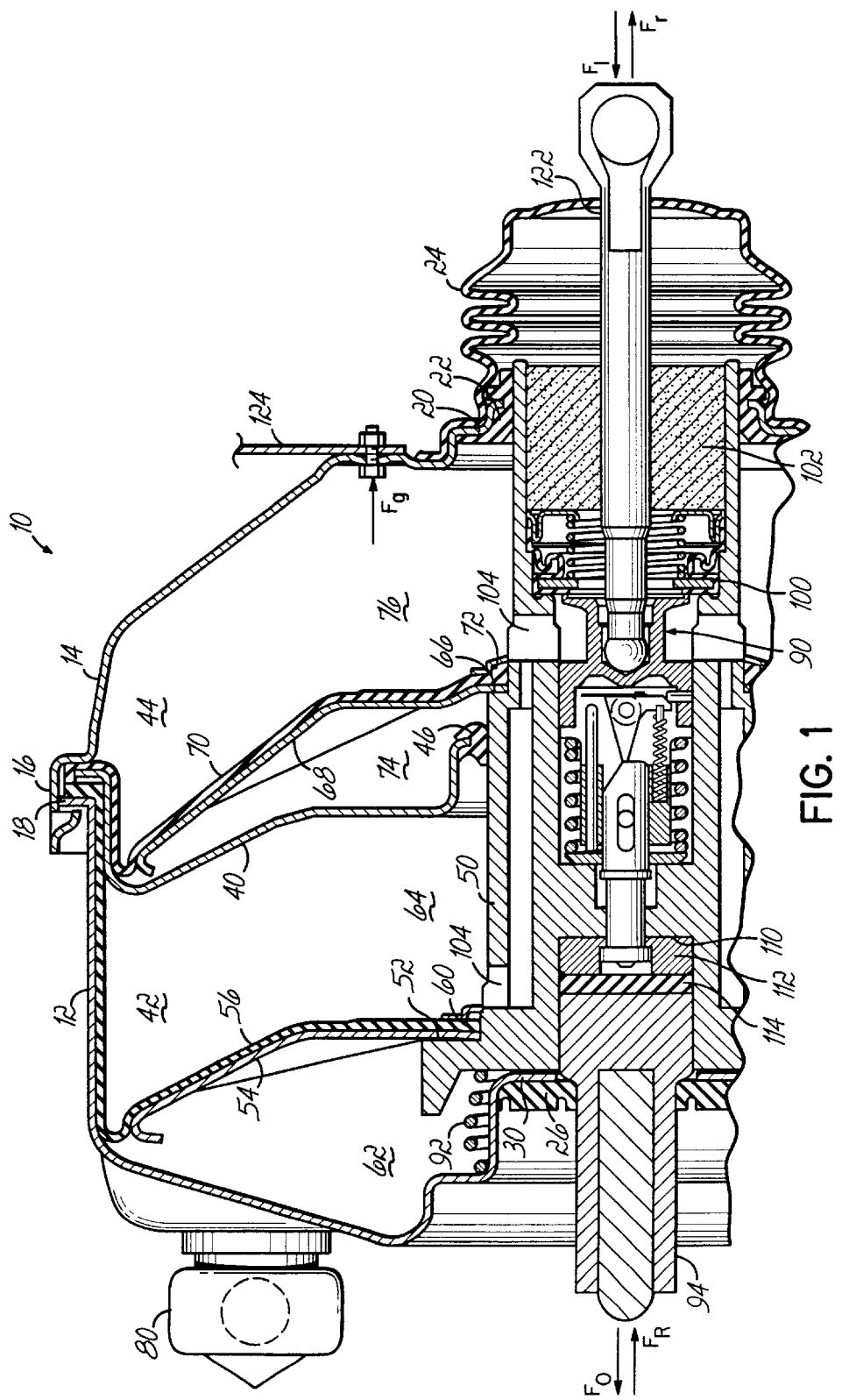
FIG. 1 is a fragmentary cross sectional view of a power booster constructed in accordance with the invention and shown with no applied input force.

Referring initially to FIG. 1, a power booster 10 is shown as a dual diaphragm vacuum operated booster in this exemplary embodiment utilizing vacuum and atmospheric pressure differentials to boost input forces $F_I$ generating intensified output forces $F_o$. However, the present invention is also applicable to systems with a single diaphragm vacuum booster and with power boosters operating with other power sources. FIG. 1 illustrates the upper portion the power booster 10 in cross section with the remaining unillustrated portion being substantially a mirror image of corresponding sections of the upper portion for purposes of the present discussion. Power booster 10 has a substantially open internal cavity which is formed by a mating front housing 12 and rear housing 14. The front and rear housings 12, 14 are formed from a substantially rigid conventional material such as metal or plastic. Rear housing 14 includes an axially extending flange 16. Axially extending flange 16 mates with outer turned flange 18 of front housing 12 locking the housings 12, 14 together. An inner edge 20 of rear housing 14 carries a seal 22. The end of rear housing 14 is enclosed by boot 24 which is received over the inner edge 20. Another seal 26 seals the area at inner edge 30 of front housing 12. The seal 26 is secured between the rearward end of an associated master cylinder (not illustrated) of the type well known in the art and the front housing 12.

A housing divider 40 separates the internal cavity into front and rear chambers 42 and 44, respectively. Housing divider 40 includes an outer peripheral flange which is engaged between the front housing 12 and rear housing 14. Housing divider 40 also includes an inner edge which carries an annular seal 46. A power piston 50 extends through annular seals 22 and 46. The power piston 50 is slidable forwardly and rearwardly within the annular seals 22 and 46, with the annular seals 22 and 46 acting as bearings for supporting the power piston 50 in the lateral direction.

Power piston 50 includes a rearwardly directed wall 52 against which support plate 54 supports diaphragm 56. Diaphragm 56 includes an integral inner annular seal 60 that engages the power piston 50. Diaphragm 56 separates chamber 42 into control volume 62 and control volume 64. Power piston 50 also includes rearwardly directed wall 66 against which support plate 68 supports diaphragm 70. Diaphragm 70 includes an integral inner annular seal 72 that engages the power piston 50. Diaphragm 70 separates rear chamber 44 into control volume 74 and control volume 76.

The diaphragms 56 and 70, and their respective support plates 54 and 68, are operable such that a vacuum pressure exists in control volumes 62 and 74. This vacuum pressure is generated therein through a vacuum check valve 80. A variable pressure exists in control volumes 64 and 76 for selectively moving power piston 50 forward in response to pressure differentials created by the introduction of atmospheric air through an air valve assembly 90. The variable pressure in control volumes 64 and 76 selectively creates a force on the respective diaphragms 56 and 70. The support plates 54 and 68 apply the force of the diaphragms to the respective rearwardly directed walls 52 and 66 of power piston 50. In response, power piston 50 compresses a return spring 92, causing power piston 50 to slide within annular seals 22 and 46 forcing output support body 94 to apply force to the associated master cylinder. The variable pressure in control volumes 64 and 76 is increased through operation of the air valve assembly 90.

Figure 2:
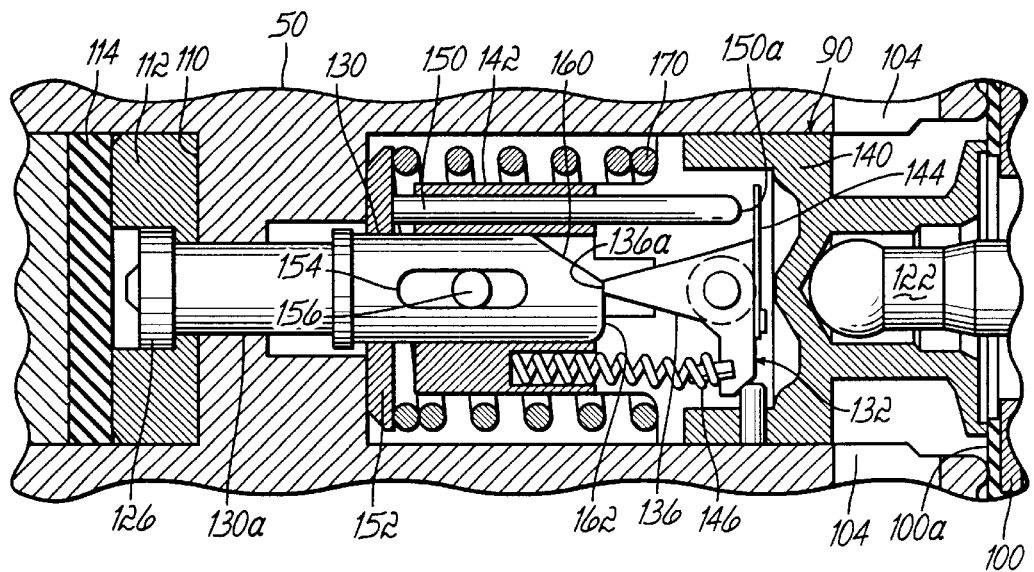
FIG. 2 is an enlarged view of the air valve assembly of this invention as shown in FIG. 1 with no applied input force.
Figure 3:
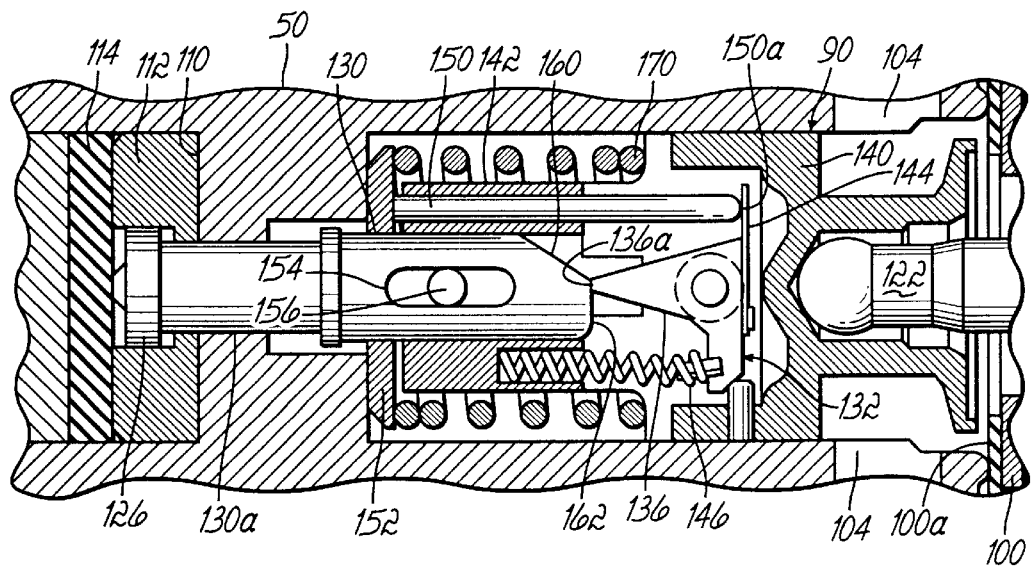
FIG. 3 is a view similar to FIG. 2 but showing an input force being applied to open the air valve assembly at a relatively low or normal apply rate.

In FIGS. 1 and 2, air valve assembly 90 is illustrated in the closed position against its mating component floating control valve 100. When opened as shown in FIG. 3, air valve assembly 10 allows atmospheric pressure to enter the control volumes 64 and 76 and thus creates a pressure differential across the diaphragms 56 and 70. The maximum pressure differential between control volumes 62 and 74 on one hand and control volumes 64 and 76 on the other hand, is the difference between generated vacuum and atmospheric. Typically, the vacuum pressure is generated by an internal combustion engine or by another form of air pump.

Referring to FIG. 1 in conjunction with FIG. 3, atmospheric air entering the power booster 10 travels through a filter 102 and the vacuum drawn from the power booster 10 exits through vacuum check valve 80 which is received in the front housing 12. Power piston 50 includes a plurality of air passages 104 through which flow is directed in a conventional manner. When the pressure in control volumes 64 and 76 reaches atmospheric, no further additional pressure differential increase is possible. The power piston 50 transmits power assisted force from an annular wall 110 of power piston 50 through an annular reaction body 112 and a reaction disc 114 to output support body 94 and therethrough, to the master cylinder (not shown). The output force $F_o$ is applied to the master cylinder by the output support body 94, which is of a two piece construction in the present embodiment, but can also be formed as one piece. The output force $F_o$ results in an equal and opposite opposing force designated as total reaction force $F_R$ that is applied to the output support body 94. The total reaction force $F_R$ is apportioned by the reaction mechanism of the power booster 10 between $F_r$ at the pushrod 122, which is transmitted to the driver's foot on the brake pedal, and $F_g$ which is grounded to the supporting structure of the associated vehicle at wall 124 through one or more points.

When the brakes are applied at a normal to low apply rate, power booster is positioned as illustrated in FIG. 3. Feedback in the form of a counteracting total reaction force $F_R$ from the master cylinder (not illustrated), is applied to the output support body 94 and therethrough to the reaction disc 114. The resiliency of the reaction disc 114 permits deformation thereof into the annular reaction body 112 so that engagement is established with a button member 126 which bears against, but is not physically coupled to, an extension 130a of reaction piston rod 130. This total reaction force $F_R$ is transmitted back through the reaction disc 114 to the annular reaction body 112 in the known manner. The reaction disc 114 biases the reaction piston rod 130 rearwardly with a percentage $F_r$ of the total reaction force $F_R$ on the reaction disc 114 providing a feedback force through piston rod 130 ultimately to the brake pedal (not illustrated) coupled with pushrod 122. Under relatively low apply rate conditions, forces are transmitted through a force transferring assembly 132 coupled between the reaction piston rod 130 and the input member or pushrod 122. The force transferring assembly 132 is more specifically a pivotal member 136 which is spring-biased into the position shown in FIG. 3. The air valve assembly 90 further comprises first and second body portions 140, 142 with the first body portion 140 being engaged with the input member or pushrod 122 and the second body portion 142 receiving the reaction piston rod 130. The pivotal member 136 is pivotally secured to the second body portion 142. A leaf spring 144 is secured on one end of the pivotal member 136 and a compression spring 146 normally biases the pivotal member 136 in a counterclockwise direction as shown in FIG. 3. An actuating member 150 in the form of a pin is affixed to an annular body 152 which receives the reaction piston rod 130. The pin 150 extends through the second body portion 142 and includes an end 150a adapted to engage the leaf spring 144. The reaction piston rod 130 includes a slot 154 and a pin 156 is engaged in the slot 154 and affixed to the second body portion 142 to allow relative sliding movement between the reaction piston rod 130 and the second body portion 142. The reaction piston rod 130 includes a cam surface 160 and an end surface 162. Normally, an end 136a of the pivotal member 136 is engaged against the end surface 162 of the reaction piston rod 130 to transfer force between the reaction piston rod 130 and the pushrod 122.

Figure 4:
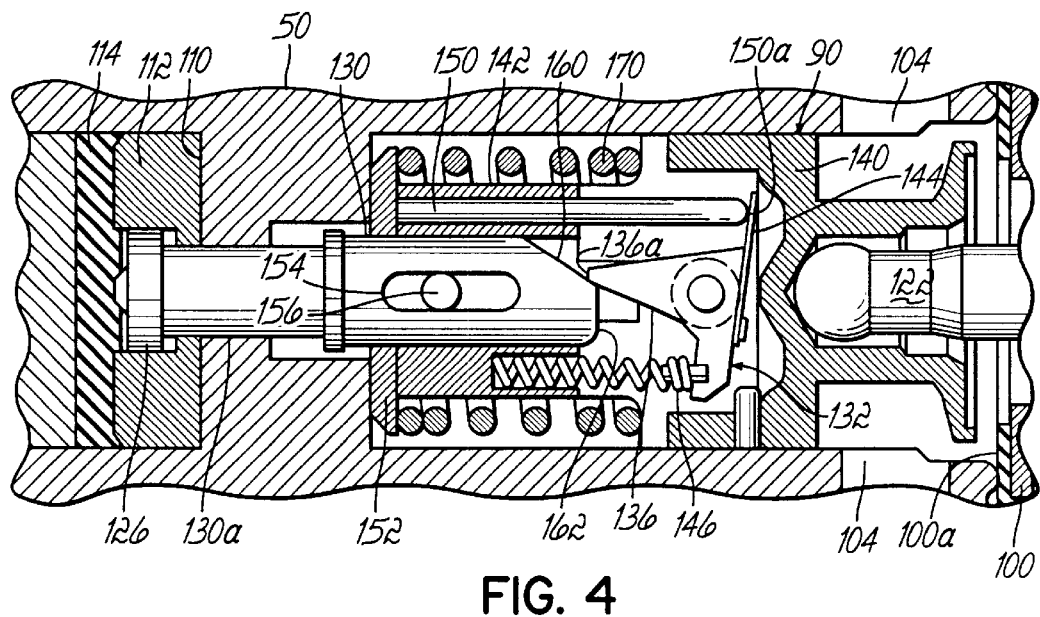
FIG. 4 is a view similar to FIGS. 2 and 3, but illustrating a relatively high rate of applied input force triggering a shortening of the air valve assembly.
Figure 5:
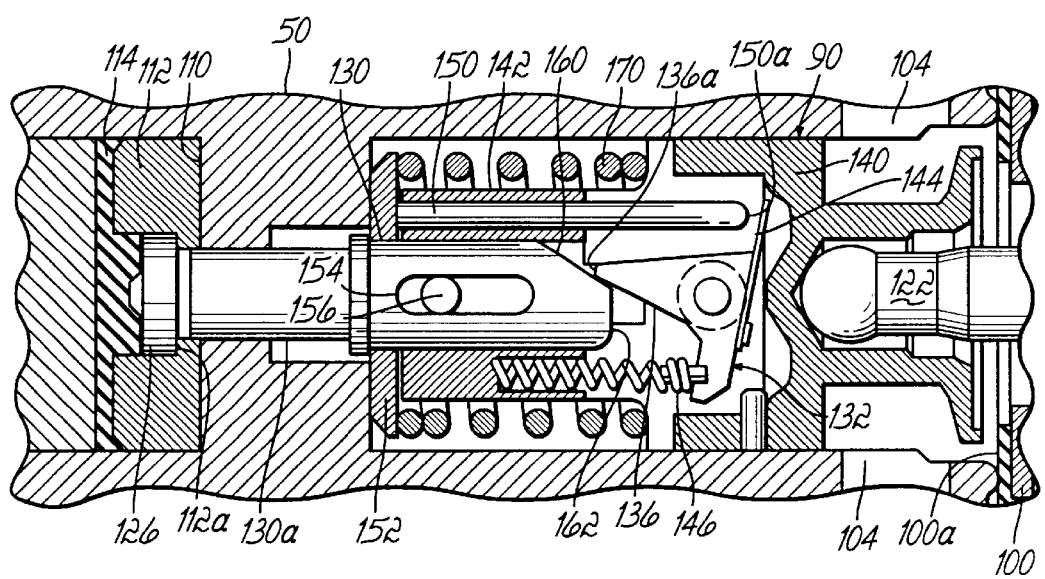
FIG. 5 is a view similar to FIG. 4, but illustrating a further application of the high rate input force.

A quick or panic apply rate of input force is shown in FIGS. 4 and 5. Here, the actuating pin 150 contacts the leaf spring 144 due to the lag of the booster 10. That is, the pressure differential in the booster 10 has not increased to the extent that run out is prevented and, therefore, this forces the pin 150 to rotate the pivotal member 136 clockwise through contact with leaf spring 144. End 136a slides along cam surface 160 and reaction piston rod therefore shortens relative to the valve seat 100a of valve 100. This shortening of the air valve assembly 90 lowers or removes the reaction force $F_r$ transmitted from the reaction disc 114 to the reaction piston rod 130 and thus the force needed by the driver to maintain a high output force $F_o$. FIG. 5 illustrates the further extrusion of reaction disc 114 through annular reaction body 112 to provide a reaction or feedback force to pushrod 122 through first and second body portions 140, 142 when button member 126 contacts ledge 112a, no further reaction force is transmitted from reaction disc 114 to reaction piston rod 130. A small gap may be created between button member 126 and the end of rod portion 130a, as shown, due to the momentum of rod 130 moving to the right, as viewed in FIG. 5.

As the pushrod 122 is released to the rest position, air valve return spring 170 forces the reaction piston rod 130 to the released position as shown in FIG. 3. As the air valve is released or closed, the force of the activation pin 150 is reduced and the return spring 170 will force the pivotal member 136 and leaf spring back 144 to their initial positions. It should be noted that during a low to normal apply rate, as the input force $F_I$ is increased, a frictional force at the contact point between the reaction piston rod 130 and the end 136a of pivotal member 136 prohibits the movement of the pivotal member 136 even if the air valve 90 is moved to the run out position and the activation pin 150 creates a positive moment on the pivotal member 136.

Figure 6:
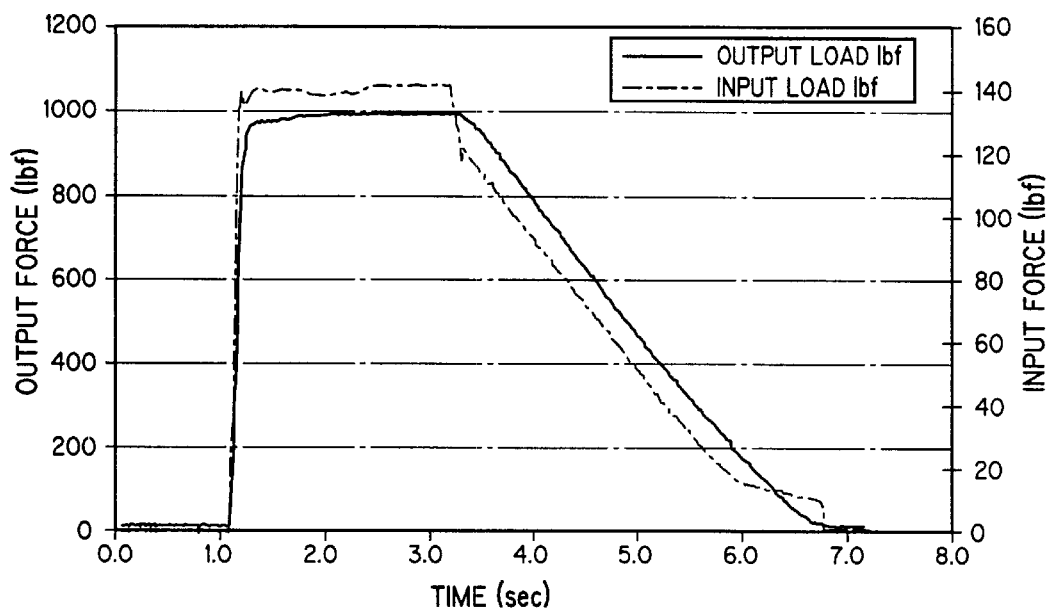
FIG. 6 is a graph illustrating output force versus time and input force versus time during a normal or relatively low rate of applied input force using a power booster constructed according to the invention.
Figure 7:
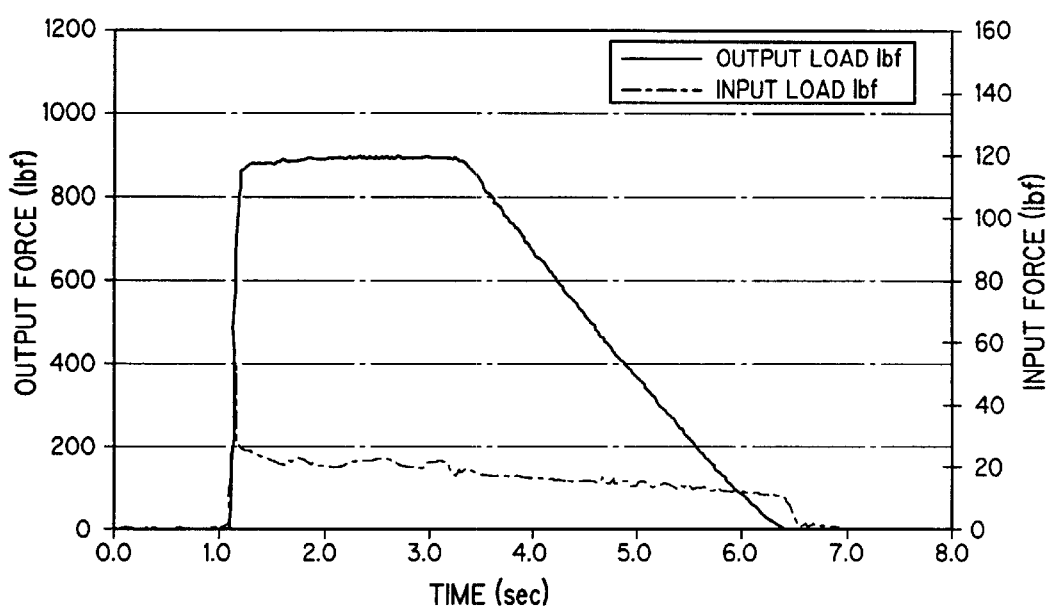
FIG. 7 is a graph illustrating output force versus time and input force versus time during a relatively high rate of applied input force using a power booster constructed according to the invention.

FIGS. 6 and 7 graphically illustrate the beneficial effects of the present invention. In particular, FIG. 6 illustrates a low to an apply rate below the activation rate of the inventive device. For example, this may be an apply rate of about 60 millimeters/second. At this rate, the input force and output force track each other relatively consistently over the period of time of brake application. As shown in FIG. 7, during a panic apply rate greater than the activation rate, for example, the input force peaks at about 60 lbf immediately after the application of the brakes. This may, for example, occur at an apply rate of about 100 millimeters/second. However, the output force peaks at approximately 900 lbf and follows essentially the same desirable curve as in the relatively low or normal apply rate shown in FIG. 6.

While the present invention has been illustrated by a description of a preferred embodiment and while this embodiment has been described in some detail, it is not the intention of the Applicants to restrict or in any way limit the scope of the appended claims to such detail. Additional advantages and modifications will readily appear to those skilled in the art. The various features of the invention may be used alone or in numerous combinations depending on the needs and preferences of the user. This has been a description of the present invention, along with the preferred methods of practicing the present invention as currently known. However, the invention itself should only be defined by the appended claims, wherein we claim:

1. A power booster for a brake system, the power booster comprising:
   a housing having an interior,
   a diaphragm separating the interior of the housing into at least two chambers,
   a power piston coupled for movement with the diaphragm and including an output member,
   a reaction member coupled to the power piston,
   an input member adapted to be coupled to a movable brake pedal,
   an air valve assembly movable between open and closed positions to selectively admit atmospheric air into at least one of the chambers to induce an output force on the diaphragm that is transferred to the output member of the power piston, the air valve assembly being length adjustable between the input member and the reaction member and having a portion adapted to engage the reaction member in response to an input force applied to the input member, wherein the air valve assembly operates at a first length when the input force is applied to the input member at a first rate and the air valve assembly operates at a second length shorter than the first length as a result of the input force being applied to the input member at a second, higher rate thereby lowering the input force needed to maintain a desired output force.

2. The power booster of claim 1, wherein the reaction member further comprises a resilient reaction disc coupled to the power piston, and an annular reaction body is further coupled to the power piston and positioned adjacent to the resilient reaction disc, and said portion of the valve assembly engages the resilient reaction disc through the annular reaction body.

3. The power booster of claim 1, wherein the air valve assembly further includes an reaction piston rod and a force transferring assembly coupled between the reaction piston rod and the input member, the force transferring assembly moveable between at least a first position in which the input force is transferred directly to the reaction piston rod and a second position which moves the air valve assembly to the second length.

4. The power booster of claim 3, wherein the force transferring assembly includes a pivotal member spring-biased into the first position and an actuating member operable to move the pivotal member into the second position when the input force is applied at the second, higher rate.

5. The power booster of claim 4, wherein the air valve assembly further includes first and second body portions, the first body portion being engaged with the input member and the second body portion receiving the reaction piston rod, the first and second body portions transferring the input force to the reaction piston rod.

6. The power booster of claim 5, wherein the actuating member is connected for sliding movement relative to the second body portion, and the pivotal member further includes a spring member on a first portion thereof engageable with the actuating member to move the pivotal member to the second position.

7. The power booster of claim 6 further comprising a return spring member coupled to a second portion of the pivotal member and configured to return the pivotal member to the first position upon a reduction of the input force.

8. The power booster of claim 5, wherein the pivotal member is secured to the first body portion and the reaction piston rod includes a slot, the air valve assembly further including a pin secured to the second body portion and retained for movement lengthwise along the slot at least during application of the input force at the second, higher rate.

9. The power booster of claim 5, wherein the first body portion includes a valve seat portion and the air valve assembly further includes a seal, the valve seat portion being movable away from the seal to the open position during application of the input force.

10. A power booster for a brake system, the power booster comprising:
   a housing having an interior,
   a diaphragm separating the interior of the housing into at least two chambers, a power piston coupled for movement with the diaphragm
   and including an output member,
   a reaction member coupled to the power piston,
   an input member adapted to be coupled to a movable brake pedal,
   an air valve assembly movable between open and closed positions to selectively admit atmospheric air into at least one of the chambers to induce an output force on the diaphragm that is transferred to the output member of the power piston, the air valve assembly including a reaction piston rod coupled with a pivotal member and having a portion adapted to engage the reaction member in response to an input force applied to the input member, the pivotal member being in a first position coupled to move together with the reaction piston rod at a first length when the input force is applied to the input member at a first rate and the pivotal member pivoting to a second position to operate together with the reaction piston rod at a second length shorter than the first length when the input force is applied to the input member at a second, higher rate thereby lowering the input force needed to maintain a desired output force.

11. The power booster of claim 10, wherein the pivotal member is spring-biased into the first position and the air valve assembly further includes an actuating member operable to move the pivotal member into the second position when the input force is applied at the second, higher rate.

12. The power booster of claim 11, wherein the air valve assembly further includes first and second body portions, the first body portion being engaged with the input member and the second body portion receiving the reaction piston rod, the first and second body portions transferring the input force to the reaction piston rod.

13. The power booster of claim 12, wherein the actuating member is connected for sliding movement relative to the second body portion, and the pivotal member further includes a spring member on a first portion thereof engageable with the actuating member to move the pivotal member to the second position.

14. The power booster of claim 13 further comprising a return spring member coupled to a second portion of the pivotal member and configured to return the pivotal member to the first position upon a reduction of the input force.

15. The power booster of claim 12, wherein the pivotal member is secured to the first body portion and the reaction piston rod includes a slot, the air valve assembly further including a pin secured to the second body portion and retained for movement lengthwise along the slot at least during application of the input force at the second, higher rate.

16. The power booster of claim 12, wherein the first body portion includes a valve seat portion and the air valve assembly further includes a seal, the valve seat portion being movable away from the seal to the open position during application of the input force.

17. A power booster for a brake system, the power booster comprising:
   a housing having an interior,
   a diaphragm separating the interior of the housing into at least two chambers,
   a power piston coupled for movement with the diaphragm,
   including an output member adapted to apply an output force from the diaphragm and receive a reaction force,
   an annular reaction body coupled to the power piston and including a central cavity,
   a resilient reaction disc positioned adjacent the annular reaction body and configured to receive the reaction force from the output member and extrude into the central cavity of the annular reaction body,
   a button member positioned within the central cavity of the annular reaction body,
   an input member adapted to be coupled to a movable brake pedal,
   an air valve assembly movable between open and closed positions to selectively admit atmospheric air into at least one of the chambers to induce the output force on the diaphragm that is transferred to the output member of the power piston, the air valve assembly having a rod portion mounted for sliding movement into the central cavity of the annular reaction body to engage the button member in response to an input force applied to the input member, the reaction force causing the resilient reaction disc to extrude against the button member to transmit the reaction force through the button member, the rod portion and the input member, wherein the button member is configured to contact the annular reaction body to stop movement thereof and thereby stop transmission of the reaction force at a maximum level,
   the button member being physically disconnected from the rod portion.

18. The power booster of claim 17, wherein the button member has a diameter greater than the diameter of the rod portion.

19. The power booster of claim 18, wherein the central cavity includes a ledge against which the button member stops at the maximum level of reaction force.

* * * * *